United States Patent [19]
Schulz

[11] 3,899,209
[45] Aug. 12, 1975

[54] ADJUSTABLE MOTORCYCLE BACKREST

[76] Inventor: Richard H. Schulz, 845 N. L St., Livermore, Calif. 94550

[22] Filed: May 17, 1974

[21] Appl. No.: 471,037

[52] U.S. Cl. .................................................. 297/383
[51] Int. Cl.² ............................................ B60N 1/02
[58] Field of Search ............ 108/145, 147; 248/419, 248/421; 297/230, 243, 284, 352, 353, 383, 361

[56] References Cited
UNITED STATES PATENTS
| 1,510,858 | 10/1924 | Nadell et al. | 297/383 |
| 2,829,863 | 4/1958 | Gibson | 108/147 UX |

*Primary Examiner*—James C. Mitchell
*Attorney, Agent, or Firm*—Harris Zimmerman

[57] ABSTRACT

An adjustable backrest apparatus for a motorcycle or the like comprises a base plate secured to the vertical rear safety bar of the vehicle, and an extension plate hinged at its lower end to the lower end of the base plate. Hinged to the extension plate is a cushioned back support joined at the upper ends thereof. A pair of extensible support members are provided, one end of each pivotally secured to a clevis bracket medially disposed on the extension plate. The distal end of one extensible member is pivotally joined to the upper end of the base plate, while the distal end of the other extensible member is pivotally joined to the lower end of the back support. Each extensible member is adjustable in length to permit variable spacing and angular orientation of the back support with respect to the vertical safety bar.

8 Claims, 11 Drawing Figures

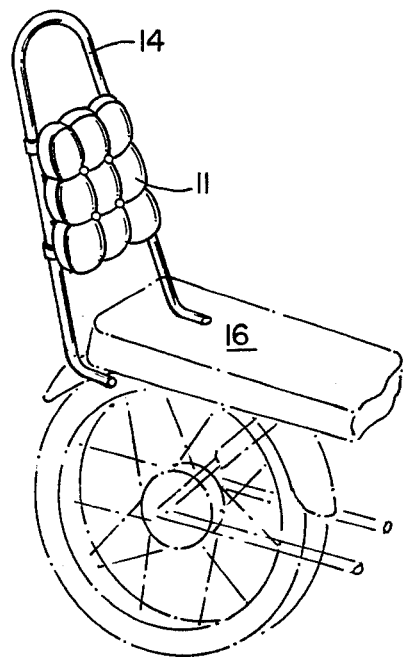
FIG_1
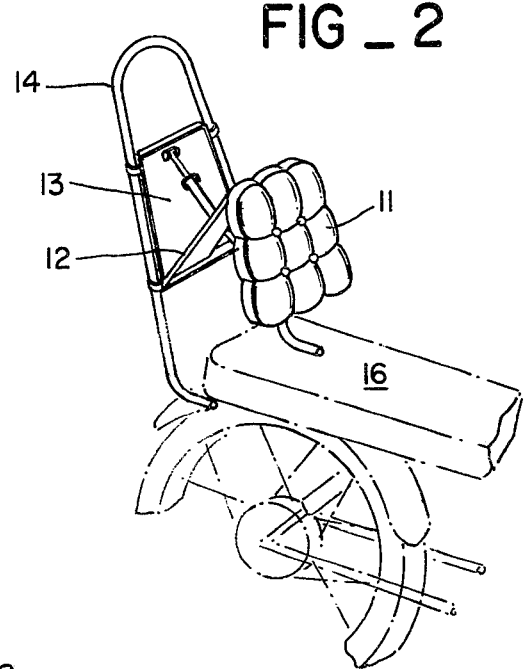
FIG_2
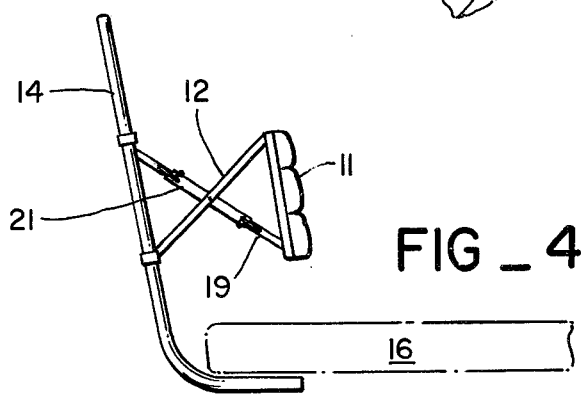
FIG_4
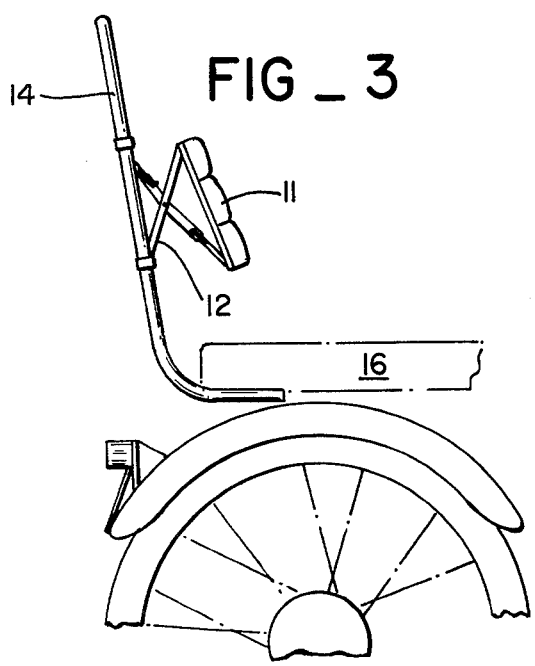
FIG_3
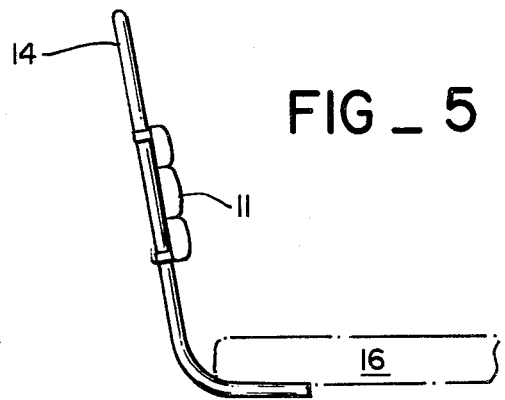
FIG_5

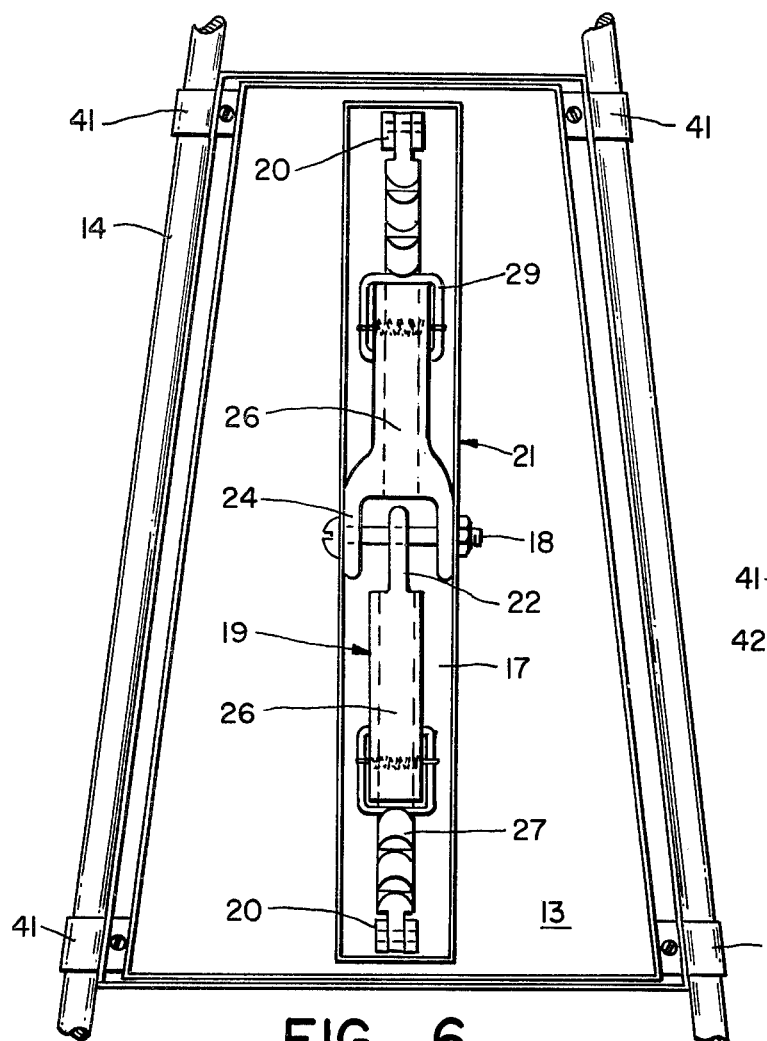
FIG_6
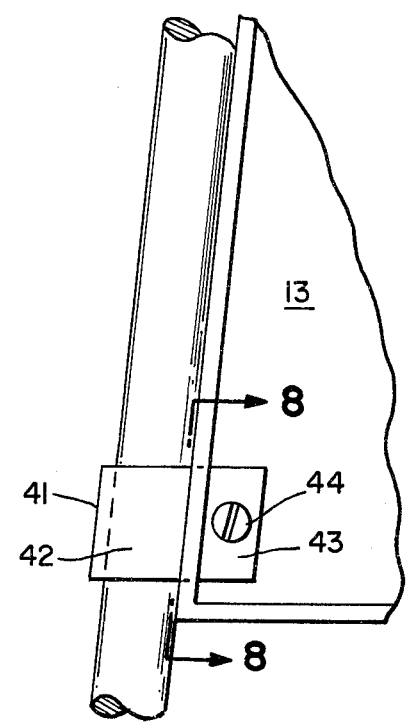
FIG_7
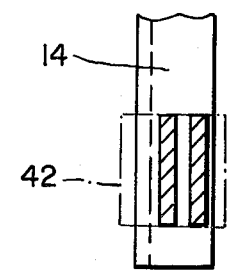
FIG_8
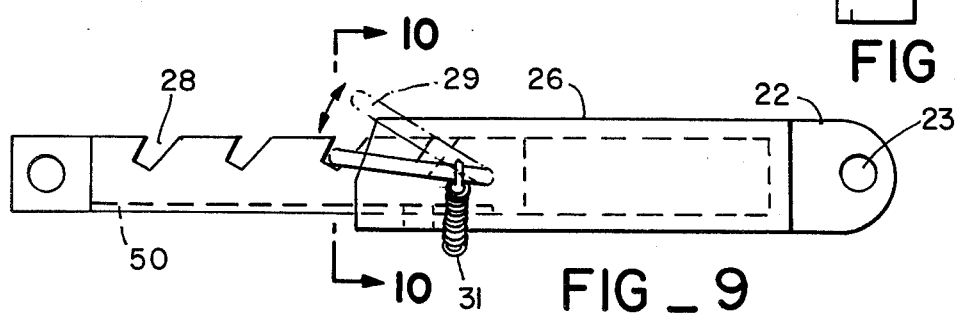
FIG_9
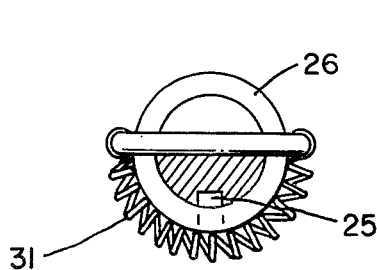
FIG_10
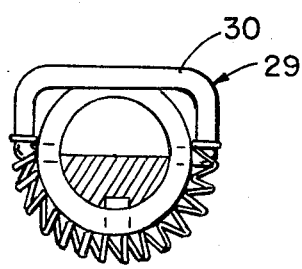
FIG_11

ADJUSTABLE MOTORCYCLE BACKREST

BACKGROUND OF THE INVENTION

In recent years two-wheel vehicles have been provided with comfortable seats for long distance travel, and for a passenger carried behind the vehicle operator. For example, the prior art reveals the use of a vertical safety bar at the rear of the vehicle, with a parallel cushion fixed thereto to provide support for the back of a passenger. Other devices employ a hinged back rest for either the operator or the passenger which fold down when not in use. These prior art devices are not adjustable to accommodate the differing physiology of operators and passengers, as are automobile seats. Further, a back rest furnished for the operator may interfere with the limited seating provided for the passenger. As many motorcycle riders and drivers will attest, a comfortable seat has yet to be designed for these vehicles.

SUMMARY OF THE INVENTION

The present invention generally comprises an adjustable backrest for a motorcycle which may be used by the driver when no passenger is being carried, or by the passenger when present. The back support cushion is vertically angularly adjustable to provide comfortable support for riders of differing posture and stature. The cushioned back support is hinged accordion-fashion to an extension plate which is hinged to a base plate. The base plate is clamped to the vertical safety bar provided at the rear of the motorcycle. A pair of extensible members are pivotally joined together to a clevis bracket which is disposed medially on the extension plate and secured thereto. The distal ends of the extensible members are pivotally joined one to the top of the base plate and the other to the bottom of the back support.

Each extensible member comprises a hollow tube which slidably and telescopically receives therein an extension element or rod which is provided with longitudinally spaced notches in diametrically opposed rows. A spring biased detent secured to the hollow tube engages the notches of the extension tube, thereby locking the extensible member at a selected length.

The extensible members are individually adjustable in length by means of the detents, so that the angular relationships between the back support, extension plate, and base plate may be easily adjusted. In this way the back support may be adjusted from flush with the vertical safety bar (for a passenger) to widely spaced apart from the vertical safety bar (for the driver). Furthermore, the vertical orientation of the back support is angularly adjustable according to the comfort requirements of the rider or passenger.

THE DRAWING

FIG. 1 is a perspective view of the present invention in the retracted position.

FIG. 2 is a perspective view of the present invention in an extended position.

FIG. 3 is a side elevation of the present invention in a partially extended disposition.

FIG. 4 is a side elevation of the present invention in the fully extended position.

FIG. 5 is a side elevation of the present invention fully retracted.

FIG. 6 is a detailed vertical elevation of a portion of the present invention.

FIG. 7 is a detailed view of a portion of the present invention.

FIG. 8 is a cross-sectional view taken along line 8—8 of FIG. 7.

FIG. 9 is a detailed view of an extensible member of the present invention.

FIG. 10 is a cross-sectional view taken along line 10—10 of FIG. 9.

FIG. 11 is a view similar to FIG. 10, but showing the detent latch in a released position.

DESCRIPTION OF THE PREFERRED EMBODIMENT

The present invention generally comprises an adjustable backrest apparatus adapted for use with a motorcycle or similar vehicle. Although the invention is described in the following with reference to such use, it should be noted that the scope of the invention is not limited by use with any particular vehicle or structure.

As shown in FIGS. 1 and 2, the invention includes a back support plate 11, cushioned to provide comfort for the user. The back support plate is hingeably joined at its upper edge to the upper end of an extension plate 12, which in turn is hinged at its lower end to a base plate 13. The base plate is secured to a vertical safety bar 14 commonly used on motorcycles and secured to the frame thereof behind the seat 16. Within the extension plate a slot 17 extends substantially the length thereof. The slot 17 is provided with flanged edges, and a lateral clevis pin 18 is secured between the flanges and disposed medially across the slot.

A pair of extensible members 19 and 21 are provided, one end of the former including a tongue 22 with a hole 23 receiving the clevis pin 18 therethrough. The extensible member 21 is provided at one end with a clevis 24 with aligned holes therethrough for likewise receiving the pin 18. The other ends of extensible members 19 and 21 are pivotally joined to brackets 20 secured to the lower end of the back support plate and to the upper end of the base plate respectively.

Each extensible member comprises a hollow tube 26 joined integrally to the tongue or clevis, as the case may be. An extension rod 27 is slidably received within each hollow tube 26, and is provided with a plurality of transaxial notches 28 longitudinally spaced along the rod. The rod 27 is also provided with a longitudinal groove 50 which is engaged by a protrusion 25 extending from the tube 26 in order to prevent rotational displacement of the telescopically engaged members. A generally U-shaped detent 29 is pivotally attached to each of the tubes 26, and includes a cross-bar or pawl 30 which may be moved into or out of engagement with selected ones of the notches 28. A spring 31 normally urges the detent into operative engagement with a notch, but the detent may be manually pivoted and raised out of the notch in order to permit axial displacement of the extensible members.

As best seen in FIG. 9, the notches are preferably sloping towards the distal end of the rod 27 so that the members 12 and 13 may be manually moved outwardly with the pawl 30 riding up and out of each notch as the rod is extended from the tube, but which will prevent contra movement unless the pawl is deliberately raised from the notch.

As shown in FIGS. 6 and 7, the base plate 13 is joined to the vertical safety bar 14 by means of clamping brackets 41 at each corner of the plate. The bracket is formed of sheet metal or plastic with an arcuate portion 42 which receives the vertical safety bar, and tubular ends 43 between which the base plate is disposed. A bolt 44 passes through the aligned holes in the tubular ends and the base plate, and is secured by a nut to clamp the bracket to the safety bar and join the base plate to the bracket.

The unique construction of the bracket apparatus of the invention permits great selection in the disposition of the back support member to provide comfortable seating in a wide range of circumstances. Due to the fact that each extensible member can be operated individually, the back support member may be adjusted both in spacing from the vertical safety bar and in angular orientation from vertical. As shown in FIG. 5, the back support may be fully retracted to furnish maximum seating space and an upright back rest. Or, the device may be partially extended and reclined, as shown in FIG. 3, for the comfort of a passenger. In the fully extended position of FIG. 4, the invention provides comfortable back support for a small passenger, or for the driver sitting back on the seat. Furthermore, the unique ability of the invention to be adjusted and reclined permits the driver or passenger to select different backrest orientations to relieve back strain which often is experienced on long excursions on motorcycles.

I claim:

1. An adjustable backrest apparatus comprising a base plate, a back support plate spaced apart and opposed to said base plate, a support member hingeably secured between said base plate and said back support plate and extending obliquely therebetween with one edge portion of said member being pivotally connected to one edge portion of one of said plates and the other edge portion of said member being pivotally connected to an opposite edge portion of the other of said plates, and extension means pivotally secured to a medial portion of said support member and extending from opposite sides thereof to said base plate and to said back support plate and hingeably connected to each of said plates to the opposite edge portions from their connections to said member for selectively varying the spacing and angular orientation between.

2. The adjustable backrest apparatus of claim 1, wherein said extension means comprises a pair of extensible members individually selectively adjustable in length.

3. The adjustable backrest apparatus of claim 2 wherein each of said pair of extensible members is pivotally joined at one end to a medial portion of said support member.

4. The adjustable backrest apparatus of claim 2 wherein each extensible member includes a tubular member and an extension member slidably received within said tubular member.

5. The adjustable backrest apparatus of claim 4 wherein said extension member includes a plurality of notches longitudinally spaced therein.

6. The adjustable backrest apparatus of claim 5 further including a detent secured to said tubular member for releasably engaging a selected one of said notches in said extension member.

7. The adjustable backrest apparatus of claim 6 wherein each detent includes a pawl integrally formed on a lever, and a spring for biasing said lever to engage said pawl in one of said notches.

8. The adjustable backrest apparatus of claim 3 wherein one extensible member includes a clevis, the other extensible member includes a tongue disposed within said clevis, and a clevis pin medially secured to said support member and joining said clevis and tongue to said support member.

* * * * *